United States Patent
Carus et al.

(10) Patent No.: US 7,818,308 B2
(45) Date of Patent: Oct. 19, 2010

(54) SYSTEM AND METHOD FOR DOCUMENT SECTION SEGMENTATION

(75) Inventors: Alwin B. Carus, Waban, MA (US); Melissa MacPherson, Albuquerque, NM (US); Stefaan Heyvaert, Cambridge, MA (US); Cornelia Parkes, Belmont, MA (US)

(73) Assignee: Nuance Communications, Inc., Burlington, MA (US)

( * ) Notice: Subject to any disclaimer, the term of this patent is extended or adjusted under 35 U.S.C. 154(b) by 312 days.

(21) Appl. No.: 11/851,871

(22) Filed: Sep. 7, 2007

(65) Prior Publication Data
US 2008/0059498 A1    Mar. 6, 2008

Related U.S. Application Data

(63) Continuation of application No. 10/953,448, filed on Sep. 30, 2004, now abandoned.

(60) Provisional application No. 60/507,136, filed on Oct. 1, 2003.

(51) Int. Cl.
*G06F 17/30* (2006.01)

(52) U.S. Cl. .................. 707/705; 707/736; 707/737; 707/755; 707/765

(58) Field of Classification Search .............. 707/3, 707/6, 705, 736, 737, 755, 756
See application file for complete search history.

(56) References Cited

U.S. PATENT DOCUMENTS

| | | |
|---|---|---|
| 4,477,698 A | 10/1984 | Szlam et al. |
| 4,965,763 A | 10/1990 | Zamora |
| 5,027,395 A | 6/1991 | Anderson et al. |
| 5,253,164 A | 10/1993 | Holloway et al. |
| 5,325,293 A | 6/1994 | Dorne |
| 5,327,341 A | 7/1994 | Whalen et al. |
| 5,392,209 A | 2/1995 | Eason et al. |
| 5,544,360 A | 8/1996 | Lewak et al. |
| 5,664,109 A | 9/1997 | Johnson et al. |
| 5,675,788 A | 10/1997 | Husick et al. |
| 5,799,268 A | 8/1998 | Boguraev |
| 5,809,476 A | 9/1998 | Ryan |
| 5,832,450 A | 11/1998 | Myers et al. |
| 5,893,109 A | 4/1999 | DeRose et al. |
| 5,905,773 A | 5/1999 | Wong |
| 5,907,841 A * | 5/1999 | Sumita et al. .............. 707/6 |
| 5,970,463 A | 10/1999 | Cave et al. |

(Continued)

OTHER PUBLICATIONS

U.S. Appl. No. 11/068,493, filed Feb. 28, 2005, Carus et al.

(Continued)

*Primary Examiner*—Jean M Corrielus
(74) *Attorney, Agent, or Firm*—Wolf, Greenfield & Sacks, P.C.

(57) ABSTRACT

A system and method for facilitating the processing and the use of documents by providing a system for categorizing document section headings under a set of canonical section headings. In the method for categorizing section headings, there may be a process of training a database and matching methods to categorize different but equivalent document section headings under canonical headings and categories. Once trained, the system may match and categorize the document sections with little to no supervision of the categorization for large sets of documents.

15 Claims, 3 Drawing Sheets

U.S. PATENT DOCUMENTS

| | | | |
|---|---|---|---|
| 5,974,412 | A | 10/1999 | Hazlehurst et al. |
| 6,006,221 | A | 12/1999 | Liddy et al. |
| 6,014,663 | A | 1/2000 | Rivette et al. |
| 6,021,202 | A | 2/2000 | Anderson et al. |
| 6,052,693 | A | 4/2000 | Smith et al. |
| 6,055,494 | A | 4/2000 | Friedman |
| 6,088,437 | A | 7/2000 | Amick |
| 6,182,029 | B1 | 1/2001 | Friedman |
| 6,192,112 | B1 | 2/2001 | Rapaport et al. |
| 6,289,353 | B1 | 9/2001 | Hazlehurst et al. |
| 6,292,771 | B1 | 9/2001 | Haug et al. |
| 6,347,329 | B1 | 2/2002 | Evans |
| 6,360,215 | B1 | 3/2002 | Judd et al. |
| 6,405,165 | B1 | 6/2002 | Blum et al. |
| 6,434,547 | B1 | 8/2002 | Mishelevich et al. |
| 6,438,533 | B1 | 8/2002 | Spackman et al. |
| 6,553,385 | B2 | 4/2003 | Johnson et al. |
| 6,854,086 | B2 | 2/2005 | Umen et al. |
| 6,915,254 | B1 | 7/2005 | Heinze et al. |
| 6,947,936 | B1 | 9/2005 | Suermondi et al. |
| 7,054,841 | B1 * | 5/2006 | Tenorio ................. 705/57 |
| 7,120,582 | B1 | 10/2006 | Young et al. |
| 7,124,144 | B2 | 10/2006 | Christianson et al. |
| 7,233,938 | B2 * | 6/2007 | Carus et al. ............. 707/1 |
| 2002/0007285 | A1 | 1/2002 | Rappaport |
| 2002/0095313 | A1 | 7/2002 | Haq |
| 2002/0143824 | A1 | 10/2002 | Lee et al. |
| 2002/0169764 | A1 | 11/2002 | Kincaid et al. |
| 2003/0046264 | A1 | 3/2003 | Kauffman |
| 2003/0061201 | A1 | 3/2003 | Grefenstette et al. |
| 2003/0079186 | A1 | 4/2003 | Gondo et al. |
| 2003/0115080 | A1 | 6/2003 | Kasravi et al. |
| 2003/0208382 | A1 | 11/2003 | Westfall |
| 2003/0233345 | A1 | 12/2003 | Perisic et al. |
| 2004/0098263 | A1 | 5/2004 | Hwang et al. |
| 2004/0103075 | A1 | 5/2004 | Kim et al. |
| 2004/0139400 | A1 | 7/2004 | Allam et al. |
| 2004/0186746 | A1 | 9/2004 | Angst et al. |
| 2004/0205638 | A1 | 10/2004 | Thomas et al. |
| 2004/0220895 | A1 | 11/2004 | Carus et al. |
| 2004/0243545 | A1 | 12/2004 | Boone et al. |
| 2004/0243551 | A1 | 12/2004 | Boone et al. |
| 2004/0243552 | A1 | 12/2004 | Titemore et al. |
| 2004/0243614 | A1 | 12/2004 | Boone et al. |
| 2005/0108010 | A1 | 5/2005 | Frankel et al. |
| 2005/0114122 | A1 | 5/2005 | Uhrbach et al. |
| 2005/0120020 | A1 | 6/2005 | Carus et al. |
| 2005/0120300 | A1 | 6/2005 | Schwager et al. |
| 2005/0144184 | A1 | 6/2005 | Carus et al. |

OTHER PUBLICATIONS

U.S. Appl. No. 10/953,471, filed Sep. 29, 2004, Cote et al.
U.S. Appl. No. 11/069,203, filed Feb. 28, 2005, Cote et al.
U.S. Appl. No. 11/007,626, filed Dec. 8, 2004, Cote et al.
U.S. Appl. No. 10/840,428, filed May 7, 2004, Carus et al.
U.S. Appl. No. 10/951,281, filed Sep. 27, 2004, Cote et al.
U.S. Appl. No. 10/951,291, filed Sep. 27, 2004, Uhrbach.
U.S. Appl. No. 10/953,474, filed Sep. 29, 2004, Frankel.
U.S. Appl. No. 10/787,889, filed Feb. 27, 2004, Carus.
U.S. Appl. No. 10/447,290, filed May 2, 2003, Boone.
U.S. Appl. No. 10/448,320, filed May 30, 2003, Boone.
U.S. Appl. No. 10/448,317, filed May 30, 2003, Boone.
U.S. Appl. No. 10/448,325, filed May 30, 2003, Titemore.
U.S. Appl. No. 10/413,405, filed Apr. 15, 2003, Carus.
U.S. Appl. No. 10/948,625, filed Sep. 23, 2004, Schwager.
F. Song et al., A graphical interface to a Senatic medical Information System, Journal of Foundations of Computing and Decision Sciences, 22(2). 1997.
F. Song et al., A graphical interface to a Senatic medical Information System, Journal of Foundations of Computing and Decision Sciences, 22(2). 1997.
F. Song et al., A Cognitive Model for the Implementation of Medical Problem Lists, Proceedings of the First Congress on Comp. Medicine, Public Health and Biotech. TX 1994.
F.Song et al. A graphical interface to a Semantic Medical Information System, Karp-95 Proceedings of the Second International Symposium on Knowledge Acquisition, Representation and Processing, pp. 107-109, 1995.
Epic Web Training Manual, pp. 1-33, 2002.
B. Hieb, Research Note, NLP Basics for Healthcare, Aug. 16, 2002.
C. Shalizi et al., Pattern Discovery in Time Series, Part I: Theory, Algorithm, Analysis, and Convergence, Journal of Machine Learning Research ? (2002) ?-? Submitted Oct. 28, 2002: Published ?/2002.
C. Nevill-Manning et al., The development of Holte's 1R Classifier, Department of Computer Science.
D. Cutting et al., A Practical Part-of-Speech Tagger, Xerox Palo Alto Research Center.
J. Zavrel et al., Recent Advances in Memory-Based Part-of-Speech Tagging, ILK/Computational Linguistics.
E. Brill, Some Advances in Transformation-Based part of Speech Tagging, Spoken Language Systems Group.
J. Nivre, DAC723: Language Technology Finite State Morphology, Vaxjo University of Mathematics and Systems Engineering, p. 1/11.
M. Creutz. Morphology and Finite-State Transucers, Oct 31, 2001, Chap 3, Jurafsky & Martin.
http://www.comp.lanes.ac.uk/computing/research/stemming/general/stemmingerrors.htm Printed Jul. 19, 2004.
http://www.comp.lanes.ac.uk/computing/research./stemming/general/performance.htm Printed Jul. 19, 2004.
M. Lee et al., Cleansing Data for Mining and Warehousing, Lecture Notes in Computer Science vol. 1677 archive, Proceedings of the 10th International Conference on Database and Expert Systems Applications, pp. 751-760, Springer-Vertag, London, 1999.
C. Van Rijsbergen, Information Retrieval, $2^{nd}$ Ed.. Ch 5, Butterworths, London, 1979.
J. Day, Extracting Knowledge from Text Using Learning by Constraint Relaxation (LCR), CSI, www.csi-inc.com/CSI/pdf/jday_icin02.pdf.
W. Gale et al., Discrimination Decisions for 100,000-Dimensional Spaces, Current Issues in Computational Linguistics, pp. 429-450, Kluwer Academic Publishers, 1994.
W. Daelemans et al., TiMBL: Tilburg Memory Based Learner, version 5.0, Reference Guide, ILK Research Group Technical Report Series No. 04-02 (ILK-0402), ILK Research Group, Tilburg University, Tilburg, Netherlands, 2004.
Case Study: Massachusetts Medical Society http://www.microsoft.com/resources/casestudies/CaseStudy.asp?CaseStudyID=14931 Posted Jan. 13, 2004.
W. Braithwaite, Continuity of Care Record (CCR) http://h17.org/library/himss/2004Orlando/ContinutiyofCareRecord.pdf.
C. Waemann, EHR vs. CCR: What is the difference between the electronic health record and the coninuity of care record?, Medical Records Institute, 2004.
Press Release: Kryptiq Announces Support of CCR Initiative and Introduces New Solutions that Enable Information Portability, Accessibility and Clinical System Interoperability. http://www.kryptiq.com/News/PressReleases/27.html Posted Feb. 17, 2004.
Work Item Summary: WK4363 Standard Specification for the Continuity of Care Record (CCR), http://www.astm.org/cgi-bin/SoftCart.ex.e/DATABASE.CART/WORKITEMS/WK4363.htm?E+mystore Mar. 3, 2004.
Continuity of Care Record (CCR): the Concept Paper of the CCR, v. 2.1b, http://www.bhinfo.com/CCR.Concept%20Paper.1.5.doc.
Continuity of Care Record, American Academy of Family Physicians. http://www.aafp.org/x24962.xml?printxml posted Nov. 12, 2003.
Continuity of Care Record (CCR), AAFP Center for Health Information Technology, http://www.centerforhit.org/x201.xml posted Aug. 20, 2004.

Core Measures web page, Joint Commission on Accreditation of Healthcare Organizations, http://www.jcaho.org/pms/core+measures/ printed Mar. 22, 2004.

Specifications Manual for National Implementation of Hospital Core Measures, v. 2.0, Joint Commission on Accreditation of Healthcare Organizations, http://www.jcaho.org/pms/core+measures/information+on+final+specifications.htm.

Code information and Education web page, American Medical Association, http://www.ama-assn.org/ama/pub/category/3884.html printed Mar. 22, 2004.

Category III CPT Codes, American Medical Association, http://www.ama-assn.org/ama/pub/article/3885-4897.html Printed Mar. 22, 2004.

ICD-9-CM Official Guidelines for Coding and Reporting, effective Oct. 1, 2003.

Q.X. Yang et al., "Faster algorithm of string comparison," Pattern Analysis and Applications, vol. 6, No. 1, Apr. 2003: pp. 122-133.

"Hardware Reference Manual," Release 3 for DOS, revised Jan. 1994, PIKA Technologies, Inc., Ontario, Canada, available at http://www.pikatechnologies.com/downloads/legacy/AVA%20B-Series%20hardware%20Manual.pdf (last accessed Jul. 25, 2005).

"Customizing D/41 Call Analysis," date unknown, Intel Corp., Santa Clara, California, available at http://resource.intel.com/telecom/support/appnotes/oustd41d.htm (last accessed Jul. 25, 2005).

* cited by examiner

SYSTEM AND METHOD FOR DOCUMENT SECTION SEGMENTATION

CROSS-REFERENCE TO RELATED APPLICATIONS

This application is a continuation of U.S. patent application Ser. No. 10/953,448, entitled "SYSTEM AND METHOD FOR DOCUMENT SECTION SEGMENTATION", filed Sep. 30, 2004 which claims the benefit of U.S. Provisional Patent Application Ser. No. 60/507,136, filed Oct. 1, 2003, which applications are hereby incorporated by reference in their entirety.

This application also relates to co-pending U.S. patent application Ser. No. 10/413,405, entitled, "INFORMATION CODING SYSTEM AND METHOD", filed Apr. 15, 2003; co-pending U.S. patent application Ser. No. 10/447,290, entitled, "SYSTEM AND METHOD FOR UTILIZING NATURAL LANGUAGE PATIENT RECORDS", filed on May 29, 2003; co-pending U.S. patent application Ser. No. 10/448,317, entitled, "METHOD, SYSTEM, AND APPARATUS FOR VALIDATION", filed on May 30, 2003; co-pending U.S. patent application Ser. No. 10/448,325, entitled, "METHOD, SYSTEM, AND APPARATUS FOR VIEWING DATA", filed on May 30, 2003; co-pending U.S. patent application Ser. No. 10/448,320, entitled, "METHOD, SYSTEM, AND APPARATUS FOR DATA REUSE", filed on May 30, 2003; co-pending U.S. patent application Ser. No. 12/233,675, entitled "METHOD, SYSTEM, AND APPARATUS FOR ASSEMBLY, TRANSPORT AND DISPLAY OF CLINICAL DATA", filed Sep. 24, 2004; co-pending U.S. Non-Provisional patent application Ser. No. 10/953,474, entitled, "SYSTEM AND METHOD FOR POST PROCESSING SPEECH RECOGNITION OUTPUT", filed on Sep. 28, 2004; co-pending U.S. Provisional Patent Application Ser. No. 60/507,134, entitled, "SYSTEM AND METHOD FOR MODIFYING A LANGUAGE MODEL AND POST-PROCESSOR INFORMATION" filed on Oct. 1, 2003; co-pending U.S. Provisional Patent Application Ser. No. 60/533,217, entitled "SYSTEM AND METHOD FOR ACCENTED MODIFICATION OF A LANGUAGE MODEL" filed on Dec. 31, 2003, co-pending U.S. Provisional Patent Application Ser. No. 60/547,801, entitled, "SYSTEM AND METHOD FOR GENERATING A PHRASE PRONUNCIATION", filed on Feb. 27, 2004, co-pending U.S. patent application Ser. No. 10/787,889 entitled, "METHOD AND APPARATUS FOR PREDICTION USING MINIMAL AFFIX PATTERNS", filed on Feb. 27, 2004; co-pending U.S. Provisional Application Ser. No. 60/547,797, entitled "A SYSTEM AND METHOD FOR NORMALIZATION OF A STRING OF WORDS," filed Feb. 27, 2004; and co-pending U.S. Provisional Application Ser. No. 60/505,428, entitled "CATEGORIZATION OF INFORMATION USING NATURAL LANGUAGE PROCESSING AND PREDEFINED TEMPLATES", filed Mar. 31, 2004, all of which co-pending applications are hereby incorporated by reference in their entirety.

BACKGROUND OF THE INVENTION

The field of the present invention is document processing and in particular to document section identification and categorization.

Documents and reports are typically organized into sections for quick reference and common practice. These sections serve to provide form and substance by providing a logical pattern to a document, grouping together similar information within a document, and identifying the location of specific information within a document. Section headings serve to label sections and categorize information for later retrieval and use.

The rapid location of document sections and the information included in a specific section is essential in the certain modern marketplaces, such as hospitals, doctors offices, and law offices. In the medical field it has been found that there is a lack of consistency in document section headings so not every hospital, technician, or doctor records the same document section under the same document section heading in every instance. For example, a hospital technician may use 'Prescribed Medications' as the heading for a particular section of a medical report while a doctor's dictated medical report refers to the same section as 'Prescription Drugs'.

Previous attempts at processing documents with structured section headings and organized information have identified this issue of different but equivalent section headings. Systems have attempted to address the issue by primarily using filters and pre-processors. For example, filters have analyzed a document and identified headings for processing. The headings are then replaced with normalized section headings acceptable to the particular system for recognition and categorization.

Unfortunately, these previous systems have difficulties and drawbacks. For example, previous systems essentially perform the filter and pre-processing procedure using handcrafted programs to address a collection of documents and the various section headings contained therein. These handcrafted programs are extremely labor-intensive and complex to create and they require a great deal of experience in programming and knowledge of the relevant headings. This results in long start-up times and high costs before document sections can be efficiently retrieved and used.

Another drawback is the site-specific or document collection-specific nature of the handcrafted programs of the previous systems. The handcrafted programs have not efficiently transferred from site to site and a program designed for one hospital or medical department is rarely adaptable for another.

SUMMARY

In a first aspect, the present invention includes a method of categorizing document sections. The method includes extracting document section headings from a set of documents, where each document may be divided into a plurality of sections. The method may also include forming a plurality of categories and standard or canonical section headings, where the canonical section headings are processed and matching features are created. The matching features and the corresponding categories of the canonical section headings may be placed in a database for stored section headings. The method may further include training the database on a subset of section headings by processing the section headings, creating matching features of the section headings, matching the section headings to stored headings in the database within a sufficient threshold, assigning the category of the matched stored heading to the section heading, and storing the features and the corresponding categories of the section headings in the database. The method could also include verifying the correct categorization of section headings until the matching step correctly categorizes the section headings within a sufficient threshold.

The present invention may also include evaluating the remaining section headings in a document set. The present invention may also include the steps of processing, creating matching features, matching, and storing correct features and categories in the database. An alternative embodiment may include the step of evaluating the remaining section headings and may include adding a verification step between the matching step and the storing step to verify the correctness of the categorization of the section headings.

In a second aspect, the present invention includes a system and method for document heading categorization including the steps of constructing a first data set consisting of exemplars having at least one pair of expressions and corresponding codes; constructing a second data set having a structural hierarchy, where the second data set contains at least one corresponding code mapped to at least one expression; transforming at least one of the expressions into a first representation, where the first representation includes sequential word features; constructing a target data set consisting of at least one first representation and at least one corresponding code; comparing a candidate string to the target data set; identifying a least dissimilar target representation in the target data set having a dissimilarity score exceeding a first pre-determined value; providing the corresponding code of the least dissimilar target in the target data set; selectively saving a candidate string having a dissimilarity score not exceeding a second pre-determined value; and selectively reviewing the saved candidate string and assigning its representation and corresponding code to the target data set.

In some embodiments the present invention may include selectively transforming at least one of expressions into a second representation, where the second representation includes a plurality of sequences of word stems. In some embodiments the present invention may include transforming at least one of the first and second representations into a third representation, where the third representation includes a plurality of n-grams. In some embodiments the set of exemplars includes empirical data consisting of headings taken from existing documents. In some embodiments the first representation includes words that are normalized to the word stems. In some embodiments the stemmed forms are filtered for non-content or stop words. In some embodiments the stemmed forms include synonyms or hypernyms. In some embodiments the third representation includes stemmed forms based upon at least one sequence of word stems or n-grams from the second representation. In some embodiments the second representation further includes filtering of stop words.

The above features are of representative embodiments only, and are presented only to assist in understanding the invention. It should be understood that they are not to be considered limitations on the invention as defined by the claims, or limitations on equivalents to the claims. Additional features and advantages of the invention will become apparent from the drawings, the following description, and the claims.

BRIEF DESCRIPTION OF THE DRAWINGS

While the specification concludes with claims particularly pointing out and distinctly claiming the present invention, it may be believed the same will be better understood from the following description taken in conjunction with the accompanying drawings, which illustrate, in a non-limiting fashion, the best mode presently contemplated for carrying out the present invention, and in which like reference numerals designate like parts throughout the figures, wherein:

DETAILED DESCRIPTION OF THE EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of computer systems, and that any such variations do not depart from the true spirit and scope of the present invention. Moreover, in the following detailed description, references are made to the accompanying figures, which illustrate specific embodiments. Electrical, mechanical, logical, and structural changes may be made to the embodiments without departing from the spirit and scope of the present invention. The following detailed description is, therefore, not to be taken in a limiting sense and the scope of the present invention is defined by the appended claims and their equivalents.

The present invention relates to document section segmentation. In particular, a document section segmentation system may be configured to process documents, identify document section headings, and categorize the document section headings under a set of canonical headings. Once the document headings have been identified and categorized, the information may be used for numerous purposes in processing data and using the documents.

The document section segmentation system may be applied to any set or type of documents. However, the system may learn faster and provide more accurate matching of section headings when applied to document sets of a specialized and specific type. While one embodiment applies the system to medical reports, one of ordinary skill in the art would understand that the system the system could be applied to any set of documents where section headings divide and define the sections of the documents. The system could be applied to general document sets, like those employed by hospitals and law offices, and specific document sets as well, like those employed in the radiology department of a hospital or the accident reporting department for an insurance agency.

An advantage exists in the present invention which facilitates the processing and the use of documents by providing a system for categorizing different section headings under a representative set of canonical section headings. Once categorized, the information may be used in numerous applications.

Another advantage of the present invention includes facilitating storage of documents and the retrieval of documents according to canonical section headings categories, regardless of whether the document section heading literally matches or may be different but equivalent to a canonical heading. For example, retrieving only the sections of medical reports containing information on a patient's prescribed medications without necessarily reviewing the patient entire set of medical history documents could save valuable time in an emergency.

Another advantage of the present invention includes normalizing or processing documents. Section headings of a document may be normalized according to the canonical section headings to provide uniformity to a document or report system. Another advantage of the present invention includes facilitating normalization and processing of an entire document. Specific sections of documents and reports pertaining to the invention can contain very specific information. The information in document sections may also be in very specific form and the language used in one section might have a specific meaning that differs from similar language in another section. Thus, categorization of the section headings may allow different kinds of processing to be appropriately applied to different sections of a document.

Another advantage of the present invention includes facilitating data reuse of document sections as described in co-pending, co-owned U.S. patent application Ser. No. 10/448, 320, which has been incorporated by reference herein. By retrieving text or document sections according to their section headings or categories, the sections can be reused and selected sections of text can be included in a new document creation. An advantage exists where the reuse of a document section according to the categorization of the section heading may save valuable time by reducing repeated dictation or typing of standard text.

Another advantage of the present invention includes the ability of the categorization system to be applied to other similar sets of documents. After training and processing the system on a set of documents, the system may be efficiently transferred to a similar set of documents at a different location. For example, a system trained and processed on a radiology department at one hospital may be transferred to a radiology department at another hospital efficiently and cost effectively.

The system may be configured to perform categorization of document section headings in essentially two phases: the training phase and the evaluation phase. In the training phase, the system may identify an exhaustive set of canonical headings or targets. The system may then be trained on a sample subset of documents with the help of a human or automated validation process to populate a section heading database with document section headings or stored instances categorized under the correct canonical headings. Such a validation process is described in co-pending and co-owned U.S. patent application Ser. No. 10/448,317, which has been incorporated by reference herein.

Once a sufficient success rate of identifying and categorizing new section headings under the correct canonical heading is reached, the training phase may end and the evaluation phase may begin. In the evaluation phase, the trained database may be applied to the entire document set to categorize the remaining document section headings in the document set with limited or no validation of the category.

Figure 1:
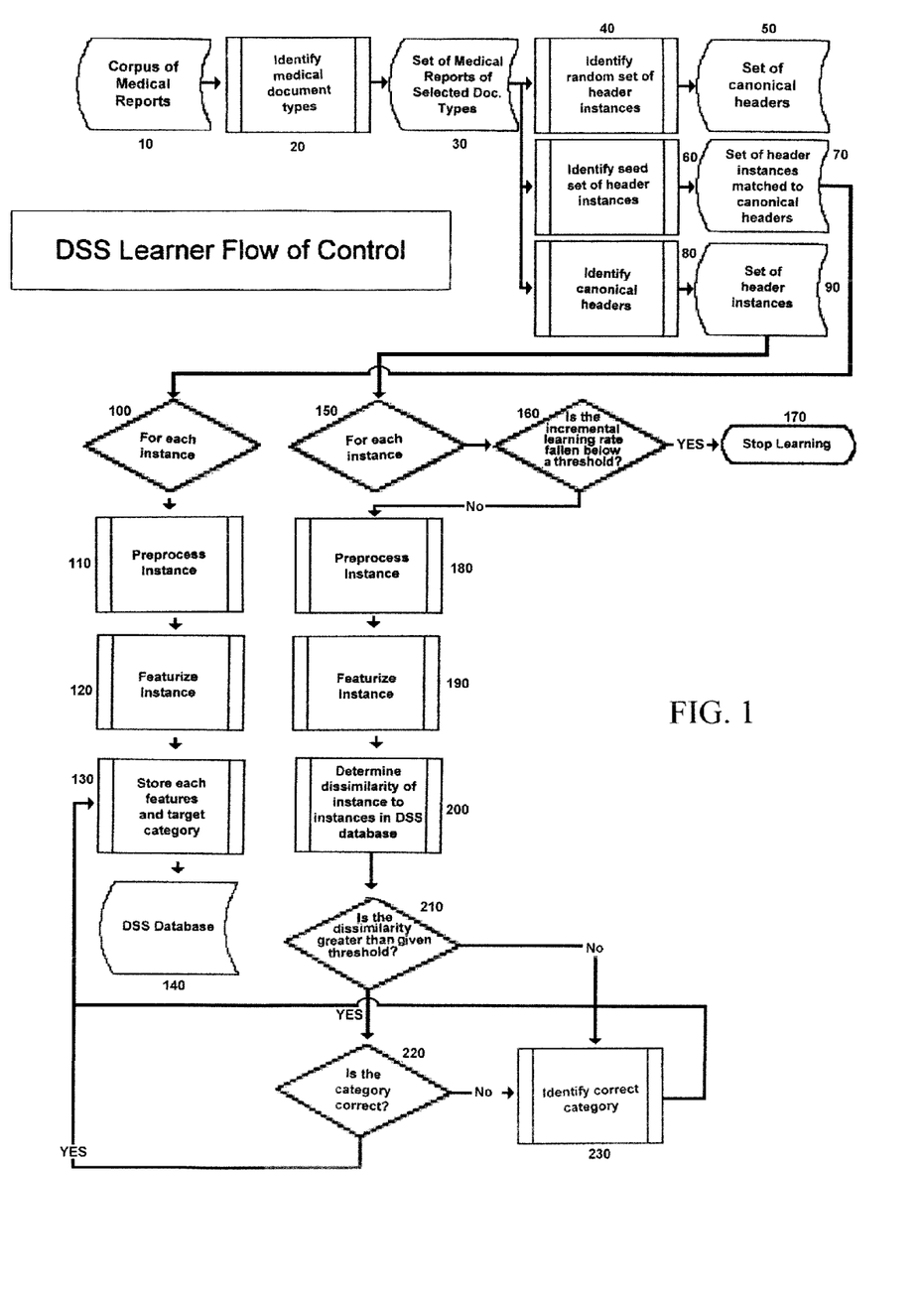
FIG. 1 illustrates an exemplary learning phase flow diagram in accordance with an embodiment.

FIG. 1 illustrates an exemplary flow diagram for a learning phase in accordance with an embodiment of the invention. It should be readily apparent to those of ordinary skill in the art that this flow diagram represents a generalized illustration and that other steps may be added or existing steps may be removed or modified. One of ordinary skill in the art would also understand that, while the embodiment disclosed in FIG. 1, FIG. 2, and FIG. 3 pertain to the area of medical reports, the system might be applied to any area of documents that include section headings.

As shown in FIG. 1, the learning phase may begin with identification of a general document area or corpus of medical reports 10. Identification of the medical document types 20 and the selection of a set of medical reports 30 demonstrate the selectivity of the document set on which the system may be optimally run. As mentioned above, if the document set is specific, the training phase and, subsequently, the evaluation phase may be more accurate and responsive.

Once the set of medical reports 30 have been selected, a human, an automated program, or a combination of the two engages in the process of identifying canonical headings 40 and establishes the set of canonical headings 50. The canonical headings 50 may be an exhaustive set, with one canonical heading for every possible canonical section of the document set. These canonical headings 50 define the major categories that the document headings may be categorized under.

The canonical headings 50 are then identified as the seed heading instances 60. This set of seed heading instances 60 is established as matched database 70 which is used to match candidate strings against the canonical headings 50. [The previous sentence is confusing.] The process 100 may be applied to the set of seed heading instances 70 and may comprise the pre-processor 10, the feature generator 120, and storing step 130 where the features of each seed instance 70 and category of each seed instance may be stored directly into the document section segmentation database 140. The database 140 may then be considered seeded with a minimal amount of stored instances. In this embodiment, the same pre-processor and feature generator is employed throughout FIG. 1, FIG. 2, and FIG. 3, however one of ordinary skill in the art would readily understand that different pre-processors and feature generators may be applied, removed or modified and still fall within the scope of the invention.

The set of medical reports 30 may be processed to identify the section headings 80 and establish the total set of heading instances 90 in the medical reports 30. The heading instances 90 may be fed into the process 150 serially. Process 150 may comprise an incremental learning test 160, a pre-processor 180, a feature generator 190, and a dissimilarity generator 200.

The incremental learning test 160 determines how well the system is matching the heading instances to the stored instances in the database 140. If the incremental learning has not fallen below a given threshold, the incremental learning test 160 may send the heading instance to the pre-processor 180 and the feature generator 190.

The pre-processor 180 may process and prepare the heading instance 90 for the feature generator 190. This processing and preparation may include normalizing text, normalization of white space, removing punctuation, and placing all characters in lower-case. Such preparation for further processing is well known in the art and one of ordinary skill in the art would understand that more or less processing and preparation might be appropriate depending on the methods employed in the feature generator 190 and the dissimilarity generator 200.

The feature generator 190 may split the heading instance 90 into smaller features used in the dissimilarity generator 200. In one embodiment, the feature generator 190 generates character-based n-grams of size four. The dissimilarity generator compares how dissimilar the heading instances 90 may be to the stored instances on the database 140 by comparing the n-grams of the heading instances 90 and n-grams of the stored instances. Although n-gram features may be used in the embodiment of FIG. 1, one of ordinary skill in the art would understand that other kinds of parsing and feature generation might be used to compare and match the heading instances 90 to the stored instances.

The dissimilarity generator 200 may compare the heading instance to the stored instances of the database 140. In this embodiment, the dissimilarity generator 200 may compare the n-gram features of the heading instance generated in the feature generator 190 to the n-gram features of the stored instances in the database 140. The dissimilarity generator 200 generates a dissimilarity measure between the heading instance and each stored instance in the database 140. The category of the least dissimilar stored instance may be applied to the heading instance 90 and the corresponding dissimilarity measure may be fed into the dissimilarity test 210.

The dissimilarity test 210 may determine if the dissimilarity measure is above a given threshold. In the embodiment of FIG. 1, the dissimilarity measure may be computed using the Dice similarity coefficient by dividing the total number or n-grams in common between the heading instance 90 and the stored instance by the total number of unique n-grams between the heading instance 90 and the stored instance. The dissimilarity measure threshold may be initially set at 0.7 but may be changed for various reasons including the rate of incremental learning of the system or the type of documents being processed. One of ordinary skill in the art would understand that the computation of the dissimilarity measure and the dissimilarity measure threshold might be changed, modified, or replaced and still fall within the scope of the invention.

If the threshold is met, then the dissimilaity test 210 may flow into the correctness test 220. A human or an automated process can provide the correctness test 220 to verify if the heading instance has been correctly matched and categorized by the dissimilarity test 210. A human may evaluate the correctness of the category in a real-time format as heading instances 90 pass through the process 150 and dissimilarity test 210. An automated process may include computation of a reliability measure for the given instance. If the reliability measure exceeds a reliability threshold, the instance may be deemed satisfied.

If the correctness test 220 is satisfied, the features generated in the feature generator 190 and the category matched by the dissimilarity generator 200 may be passed through the storing step 130 and stored in the database 140. Note that by adding an additional stored instance, the database 140 and the dissimilarity generator 200 may be considered to have learned another stored instance and be more likely to match a greater number of heading instances in the future. Note that if the heading instance is a literal match to any stored instance in the database 140, the dissimilarity test 210 and the correctness test 220 may be necessarily satisfied. However, in a literal matching circumstance there may be no need to store duplicate features of the literal match in the database 140.

If either of the dissimilarity test 210 or the correctness test 220 is failed, the heading instance may be processed for category identification 230. Category identification 230 may occur in real-time with a human reviewer applying a correct category to the heading instance 90. The category identification 230 may also store the failed heading instances for a human reviewer or for repeating the process 150 at a later time. If a human reviewer identifies the correct category, the features of the heading instance and the reviewer provided category might be stored in the database 140 as an additional stored instance. Note again that with every added stored instance, the database 140 and the dissimilarity generator 200 may be more capable of matching and categorizing future heading instances.

If the incremental learning improvement falls below a given threshold, the incremental learning test 160 may end the learning phase 170. Incremental learning improvement may be computed by dividing the number of failed dissimilarity tests 210 by the number of heading instances processed. Although the incremental learning may be computed in this manner, one of ordinary skill in the art would understand that the end of the learning phase 170 might be determined in other ways, such as setting a maximum number of heading instances 90 to be processed. It could also be possible to reduce the dissimilarity threshold by incremental amounts for a given category or all categories after each successful dissimilarity test 210 in order to adjust the optimal length of the learning phase.

Figure 2:
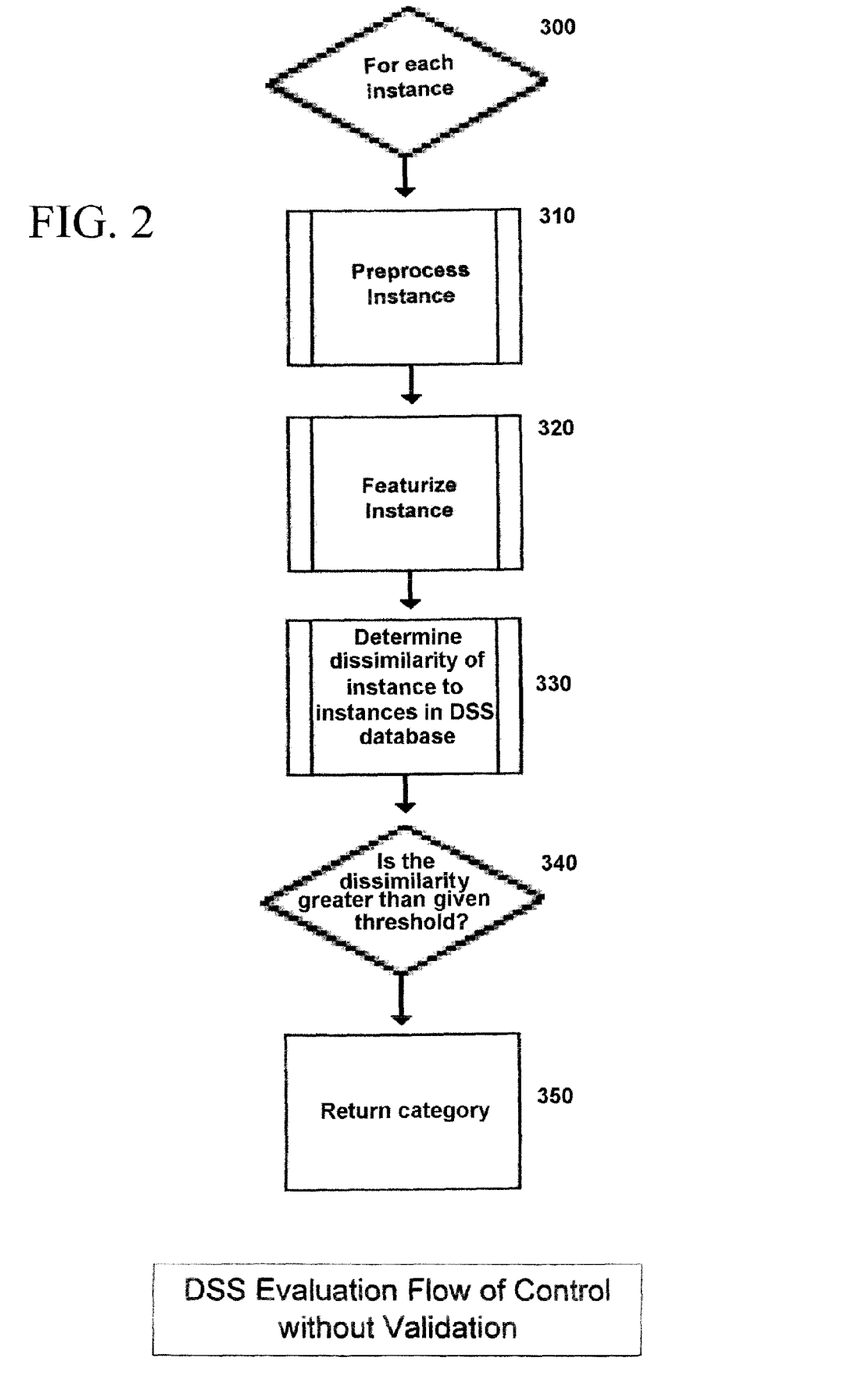
FIG. 2 illustrates an exemplary evaluation flow diagram without validation.

FIG. 2 illustrates an exemplary flow diagram for the evaluation phase without validation in accordance with the embodiment illustrated in FIG. 1. It should be readily apparent to those of ordinary skill in the art that this flow diagram represents a generalized illustration and that other steps may be added or existing steps may be removed or modified.

As shown in FIG. 2, the evaluation phase without validation may be very similar to portions of the learning phase. Process 300 may perform substantially the same as process 150 in FIG. 1 and include a pre-processor 310, a feature generator 320, and a dissimilarity generator 330. The evaluation phase may also have a dissimilarity test 340 performing substantially the same as dissimilarity test 210. The remainder of the heading instances 90, unprocessed from the learning phase, may be serially processed by process 300. Also, the evaluation phase may process any new documents, not previously in the set of documents 30, by extracting any heading instances and processing the heading instances through process 300.

In the dissimilarity generator 330, the category of the least dissimilar stored instance may be applied to the heading instance 90 and the corresponding dissimilarity measure is fed into the dissimilarity test 340. If the dissimilarity measure meets the threshold of the dissimilarity test 340, then the heading instance 90 may be assigned a correct category 350. The features and the category of the heading instance may be stored in the database 140 as an additional stored instance. Note that even though the learning phase may have ended, one of ordinary skill in the art would understand that as additional stored instances increase the ability of the database 140 and dissimilarity generator 330 to match and categorize heading instances.

As stated above, if the heading instance is a literal match, then a correct category may be assigned. However, there may be no need to store a duplicate of the heading instance 90 in the database 140. If the dissimilarity measure does not meet the threshold, then no category may be assigned and the features of the failed heading instance 90 is not stored in the database 140. The heading may be optionally retained for later review.

The evaluation without validation may provide fast and responsive categorization of the vast majority of section headings and may leave a small percentage of headings not categorized. One of ordinary skill in the art of document processing would understand that speed and processing all but a small percentage might be the optimal process for a given use of section heading categorization. For example, data or information extraction may favor an evaluation without validation in order to keep speed and throughput high.

Figure 3:
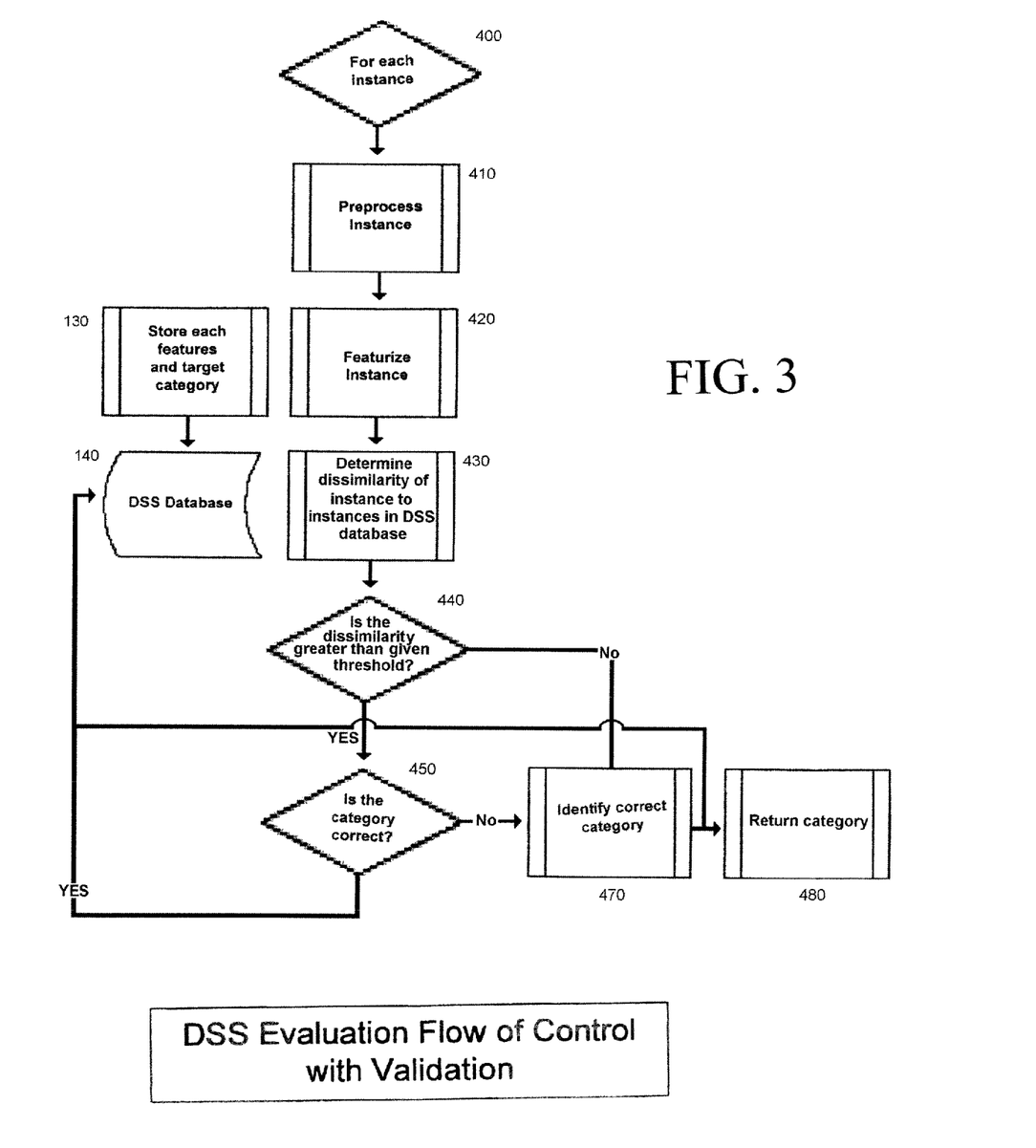
FIG. 3 illustrates an exemplary evaluation flow diagram with validation.

FIG. 3 illustrates an exemplary flow diagram for the evaluation phase with validation in accordance with the embodiment illustrated in FIG. 1. It should be readily apparent to those of ordinary skill in the art that this flow diagram represents a generalized illustration and that other steps may be added or existing steps may be removed or modified.

As shown in FIG. 3, the evaluation phase with validation may be very similar to portions of the learning phase. Process 400 may perform substantially the same as process 150 in FIG. 1 and include a pre-processor 410, a feature generator 420, and a dissimilarity generator 430. The evaluation phase may also have a dissimilarity test 440 performing substantially the same as dissimilarity test 210. The remainder of the heading instances 90, unprocessed from the learning phase, may be serially processed by process 400. Also, the evaluation phase may process any new documents, not previously in the set of documents 30, by extracting any heading instances and processing the heading instances through process 400.

The correctness test 450 may also perform substantially the same as the correctness test 220 and the identification of the correct category 470 by a human reviewer may perform substantially the same as the identification of correct category 230.

In the dissimilarity generator 430, the category of the least dissimilar stored instance may be applied to the heading instance 90 and the corresponding dissimilarity measure is fed into the dissimilarity test 440. If the dissimilarity measure meets the threshold of the dissimilarity test 440, the heading instance 90 may be passed to the correctness test 450. If the category is deemed correct according to the same possible processes of the correctness test 220, then the heading instance 90 may be assigned a correct category and the features and category of the heading instance may be stored in the database 140 as an additional stored instance. Again, if the heading instance is a literal match, then a correct category may be assigned. However, there may be no need to store a duplicate of the heading instance 90 in the database 140. If the dissimilarity measure does not meet the threshold or the category fails the correctness test 470, then no category is assigned. The heading instance 90 may be identified and assigned a correct category 480 by a human reviewer or stored and compiled for later review as a group. If a reviewer assigns a correct category, then the category and the features of the heading instance 90 may be stored in the database 140 as an additional stored instance. [The next paragraph describes a benefit that could also be placed in the Summary of the Invention.]

Note that the human reviewer described in regards to FIG. 1 and FIG. 3 may only need to understand the significance of and be knowledgeable of the canonical headings and the various section headings of the set of documents. The reviewer may need to be capable of correctly categorizing various section headings under the canonical headings but may not need any programming knowledge or experience to populate the database 140 with stored instances.

While the invention has been described with reference to the exemplary embodiment thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Further undescribed alternative embodiments are possible. It will be appreciated that many of those undescribed embodiments are within the literal scope of the following claims, and others are equivalent.

What is claimed is:

1. An automated computer implemented method for categorizing document section headings comprising the steps of:
   determining a set of canonical section headings from a set of documents;
   establishing a data set containing said canonical section headings and information associating at least one of the canonical section headings with at least one other section heading that is different from the at least one of the canonical section headings but corresponds to the at least one of the canonical section headings;
   extracting at least one section heading from another document;
   transforming the extracted section heading into a plurality of n-grams, and;
   associating the extracted section heading with a particular one of the canonical section headings in the data set if said plurality of n-grams have a predetermined level of similarity to said particular one of the canonical section headings.

2. The method according to claim 1, where the canonical section headings include empirical data consisting of headings taken from existing documents.

3. The method according to claim 1, where the canonical section headings include words that are normalized to the word stems.

4. The method according to claim 3, where the stemmed forms are filtered for non-content or stop words.

5. The method according to claim 3, where the stemmed forms include synonyms or hypernyms.

6. At least one computer readable storage medium encoded with instructions that, when executed, perform a method for categorizing document section headings comprising acts of:
   determining a set of canonical section headings from a set of documents;
   establishing a data set containing said canonical section headings and information associating at least one of the canonical section headings with at least one other section heading that is different from the at least one of the canonical section headings but corresponds to the at least one of the canonical section headings;
   extracting at least one section heading from another document;
   transforming the extracted section heading into a plurality of n-grams, and;
   associating the extracted section heading with a particular one of the canonical section headings in the data set if said plurality of n-grams have a predetermined level of similarity to said particular one of the canonical section headings.

7. The at least one computer readable storage medium according to claim 6, where the canonical section headings include empirical data consisting of headings taken from existing documents.

8. The at least one computer readable storage medium according to claim 6, where the canonical section headings include words that are normalized to the word stems.

9. The at least one computer readable storage medium according to claim 8, where the stemmed forms are filtered for non-content or stop words.

10. The at least one computer readable storage medium according to claim 8, where the stemmed forms include synonyms or hypernyms.

11. A system comprising:
    at least one processor programmed to;
    determine a set of canonical section headings from a set of documents;
    establish a data set containing said canonical section headings and information associating at least one of the canonical section headings with at least one other section heading that is different from the at least one of the canonical section headings but corresponds to the at least one of the canonical section headings;
    extract at least one section heading from another document;

transform the extracted section heading into a plurality of n-grams, and;

associate the extracted section heading with a particular one of the canonical section headings in the data set if said plurality of n-grams have a predetermined level of similarity to said particular one of the canonical section headings.

12. The system according to claim 11, where the canonical section headings include empirical data consisting of headings taken from existing documents.

13. The system according to claim 11, where the canonical section headings include words that are normalized to the word stems.

14. The system according to claim 13, where the stemmed forms are filtered for non-content or stop words.

15. The system according to claim 13, where the stemmed forms include synonyms or hypernyms.

* * * * *